United States Patent
Okamoto et al.

(10) Patent No.: US 10,230,853 B2
(45) Date of Patent: Mar. 12, 2019

(54) TERMINAL DEVICE, DIAGNOSIS SYSTEM AND INFORMATION OUTPUT METHOD FOR OUTPUTTING INFORMATION COMPRISING AN INSTRUCTION REGARDING HOW TO RECORD A SOUND FROM A TARGET APPARATUS

(71) Applicant: FUJI XEROX CO., LTD., Tokyo (JP)

(72) Inventors: Seiji Okamoto, Yokohama (JP); Junichi Hirota, Yokohama (JP); Tsutomu Udaka, Yokohama (JP); Tomoyuki Mitsuhashi, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/226,001

(22) Filed: Aug. 2, 2016

(65) Prior Publication Data
US 2017/0201633 A1    Jul. 13, 2017

(30) Foreign Application Priority Data
Jan. 8, 2016    (JP) .................................. 2016-002189

(51) Int. Cl.
| | |
|---|---|
| H04L 12/28 | (2006.01) |
| H04N 1/00 | (2006.01) |
| H04R 29/00 | (2006.01) |

(52) U.S. Cl.
CPC ..... *H04N 1/00015* (2013.01); *H04N 1/00029* (2013.01); *H04N 1/00061* (2013.01); *H04N 1/00079* (2013.01); *H04R 29/008* (2013.01); *H04L 12/2825* (2013.01); *H04L 12/2836* (2013.01); *H04N 2201/0003* (2013.01); *H04N 2201/0082* (2013.01); *H04N 2201/0096* (2013.01)

(58) Field of Classification Search
None
See application file for complete search history.

(56) References Cited

U.S. PATENT DOCUMENTS

| | | | |
|---|---|---|---|
| 6,772,633 B2 | 8/2004 | Terry et al. | |
| 6,870,480 B2* | 3/2005 | Suzuki ................... | G05B 15/02 340/531 |
| 7,136,605 B2 | 11/2006 | Tsunoda et al. | |
| 7,502,570 B2 | 3/2009 | Nishimura | |
| 8,132,049 B2* | 3/2012 | Yasukawa ........... | G06F 11/0733 714/26 |
| 8,150,278 B2 | 4/2012 | Satoh et al. | |

(Continued)

FOREIGN PATENT DOCUMENTS

| | | | | |
|---|---|---|---|---|
| JP | 2004144579 | * | 5/2004 | ............... G01H 3/12 |
| JP | 2007-79263 A | | 3/2007 | |

(Continued)

OTHER PUBLICATIONS

Carl Parker, How to use S Beam, Mar. 11, 2013, Android Authority website.*

(Continued)

*Primary Examiner* — Barbara D Reinier
(74) *Attorney, Agent, or Firm* — Sughrue Mion, PLLC

(57) ABSTRACT

A terminal device including a detection unit that detects a sound, and an output unit that outputs information regarding a detection method of detecting the sound by the detection unit.

5 Claims, 19 Drawing Sheets

(56) References Cited

U.S. PATENT DOCUMENTS

| | | | |
|---|---|---|---|
| 8,204,189 B2* | 6/2012 | Rhodes | G06F 13/4278 379/102.07 |
| 8,325,054 B2* | 12/2012 | Kim | H04L 12/2825 340/5.71 |
| 8,346,508 B2* | 1/2013 | Kim | H04L 12/2825 340/679 |
| 8,864,130 B2 | 10/2014 | Umi et al. | |
| 9,979,560 B2* | 5/2018 | Kim | H04L 12/2825 |
| 2002/0073025 A1* | 6/2002 | Tanner | G06F 9/4446 705/39 |
| 2004/0112136 A1 | 6/2004 | Terry et al. | |
| 2007/0032968 A1 | 2/2007 | Nakamura | |
| 2007/0070456 A1 | 3/2007 | Nishimura | |
| 2012/0099829 A1* | 4/2012 | Moberg | H03G 3/3005 386/200 |
| 2012/0127831 A1 | 5/2012 | Gicklhorn et al. | |
| 2012/0224052 A1 | 9/2012 | Bae | |
| 2013/0315405 A1 | 11/2013 | Kanishima et al. | |
| 2014/0003625 A1 | 1/2014 | Sheen et al. | |
| 2014/0140675 A1* | 5/2014 | de Sa | H04N 21/21805 386/223 |
| 2014/0342671 A1 | 11/2014 | Kim et al. | |
| 2015/0358779 A1 | 12/2015 | Yuksel | |
| 2016/0011850 A1 | 1/2016 | Sheen et al. | |
| 2016/0061586 A1 | 3/2016 | Broga et al. | |
| 2016/0112602 A1* | 4/2016 | Kawai | H04N 1/32635 358/1.14 |

FOREIGN PATENT DOCUMENTS

| | | |
|---|---|---|
| JP | 2008-290288 A | 12/2008 |
| JP | 5954648 B1 | 7/2016 |

OTHER PUBLICATIONS

Communication dated Jun. 17, 2016, from the Japanese Patent Office in counterpart application No. 2016-002189.

U.S. Appl. No. 15/226,087, Seiji Okamoto, et al., filed Aug. 2, 2016.

Office Action dated Mar. 16, 2017, issued by the Australian Intellectual Property Office in counterpart Australian Application No. 2016222349.

Communication issued by the United States Patent and Trademark Office dated Oct. 5, 2017 in counterpart U.S. Appl. No. 15/226,087.

Office Action issued by the Australian Patent Office dated Aug. 23, 2017 in counterpart Australian Patent Application No. 2016216549.

* cited by examiner

FIG. 5

| MODEL NAME: ABC001 | | | |
|---|---|---|---|
| WAVEFORM DATA OF FREQUENCY ANALYSIS RESULT | SOUND DATA OF ABNORMAL SOUND | CAUSE OF ABNORMAL SOUND | HANDLING METHOD |
| WAVEFORM DATA 1 | SOUND DATA 1 | ABRASION OF PHOTOCONDUCTOR | EXCHANGE OF PHOTOCONDUCTOR |
| WAVEFORM DATA 2 | SOUND DATA 2 | GREASE SHORTAGE OF SHEET TRANSPORT DEVICE | APPLY GREASE |
| ..... | ..... | ..... | ..... |
| WAVEFORM DATA 30 | SOUND DATA 30 | DEFECT OF DRIVE MOTOR | EXCHANGE OF DRIVE MOTOR |

MODEL NAME: ABC002

MODEL NAME: ABC003

FIG. 17

| TERMINAL DEVICE 10A | | | | | |
|---|---|---|---|---|---|
| MODEL NAME: ABC001 | LOCATION | DISTANCE | ANGLE | ORIENTATION | PHOTO |
| | REGION A | 10cm | HORIZONTAL | UPPER | 11 |
| | REGION B | 10cm | HORIZONTAL | UPPER | 12 |
| | REGION C | 10cm | HORIZONTAL | UPPER | 13 |
| | REGION D | 5cm | HORIZONTAL | UPPER | 14 |
| | REGION E | 5cm | VERTICAL | UPPER | 15 |
| | REGION F | 5cm | VERTICAL | LOWER | 16 |
| MODEL NAME: ABC002 | | | | | |

| TERMINAL DEVICE 10B | | | | | |
|---|---|---|---|---|---|
| MODEL NAME: ABC001 | LOCATION | DISTANCE | ANGLE | ORIENTATION | PHOTO |
| | REGION A | 5cm | HORIZONTAL | LOWER | 20 |
| | REGION B | 5cm | HORIZONTAL | LOWER | 21 |
| | REGION C | 5cm | HORIZONTAL | LOWER | 22 |

TERMINAL DEVICE, DIAGNOSIS SYSTEM AND INFORMATION OUTPUT METHOD FOR OUTPUTTING INFORMATION COMPRISING AN INSTRUCTION REGARDING HOW TO RECORD A SOUND FROM A TARGET APPARATUS

CROSS-REFERENCE TO RELATED APPLICATIONS

This application is based on and claims priority under 35 USC 119 from Japanese Patent Application No. 2016-002189 filed on Jan. 8, 2016.

BACKGROUND

Technical Field

The present invention relates a terminal device, a diagnosis system and an information output method.

SUMMARY

According to an aspect of the invention, there is provided a terminal device including: a detection unit that detects a sound; and an output unit that outputs information regarding a detection method of detecting the sound by the detection unit.

BRIEF DESCRIPTION OF THE DRAWINGS

Exemplary embodiments of the present invention will be described in detail based on the following figures, wherein:

FIG. 5 is a diagram illustrating an instance of information stored in a waveform data storing unit 53 illustrated in FIG. 4;

FIG. 15 is a diagram illustrating a first exemplary display for a recording method in a terminal device 10a;

FIG. 17 is a diagram illustrating an instance of a recording method guidance list;

FIG. 18 is a diagram illustrating a second exemplary display for a recording method in the terminal device 10a; and FIG. 19 is a diagram illustrating a third exemplary display for a recording method in the terminal device 10a.

DETAILED DESCRIPTION

Hereinafter, exemplary embodiments of the invention will be described in detail with reference to the drawings.

Figure 1:
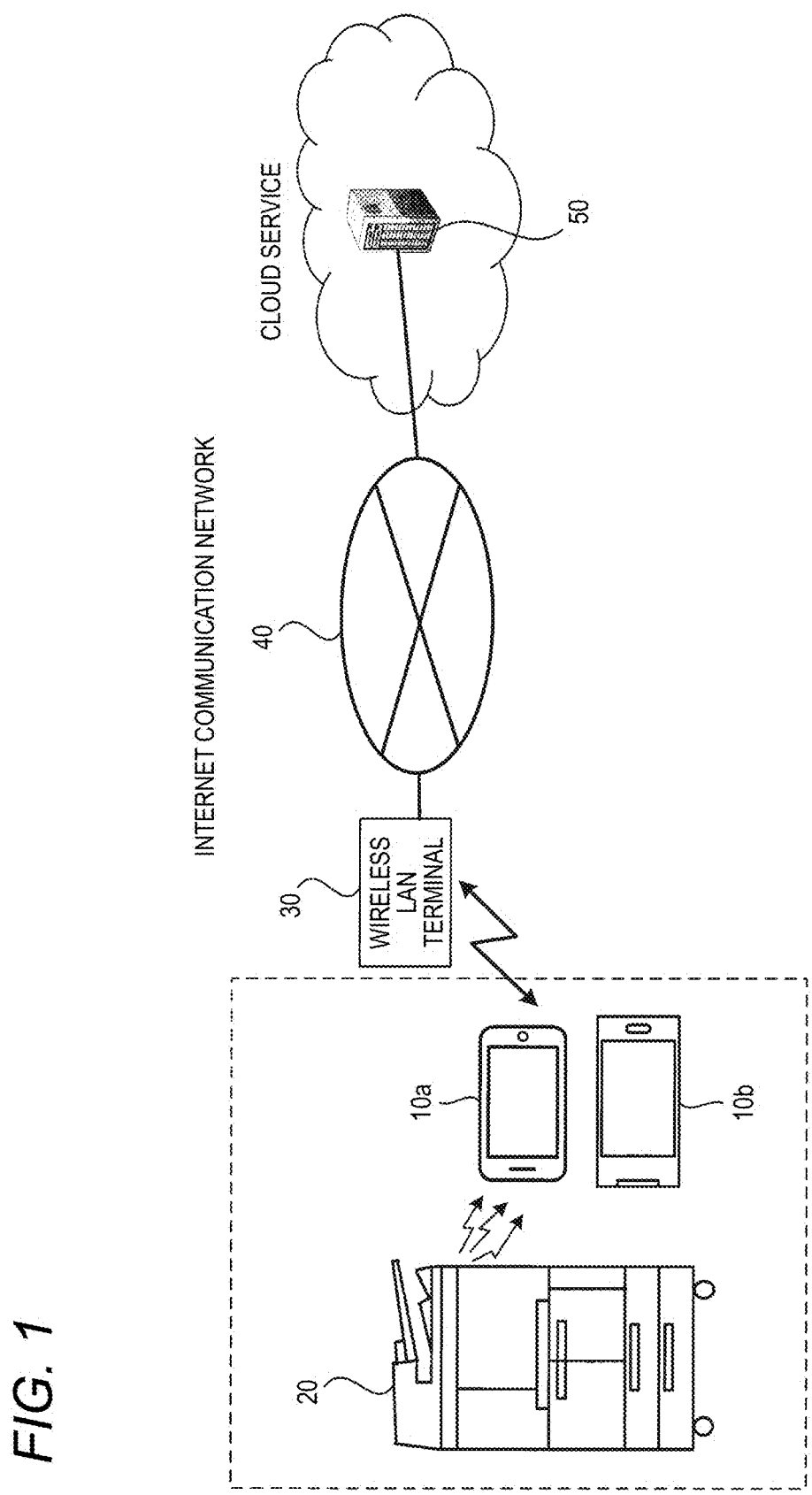
FIG. 1 is a system diagram illustrating the configuration of a diagnosis system according to an exemplary embodiment of the invention.

FIG. 1 is a system diagram illustrating the configuration of a diagnosis system according to an exemplary embodiment of the invention.

As illustrated in FIG. 1, the diagnosis system according to the exemplary embodiment of the invention includes a server apparatus 50 and portable terminal devices 10a and 10b such as personal computers, smart phones, or tablet terminal devices.

Each of the terminal devices 10a and 10b is configured as a diagnosis apparatus that diagnoses an image forming apparatus 20 based on a sound emitted from the image forming apparatus 20. The invention can applied to the terminal devices 50 as long as the terminal devices are apparatus which can be connected to the server apparatus via a communication network. However, the description in this exemplary embodiment will be made using a case in which the terminal devices 10a and 10b are tablet terminal devices which are provided with devices such as microphones capable of acquiring a sound signal and a touch panels to receive a touch input.

Any one of the terminal devices 10a and 10b is carried by a service engineer (maintenance personnel) who maintains or repairs the image forming apparatus 20 such as a printer used by an end user. The terminal device 10a or 10b is used to acquire a sound signal generated in the image forming apparatus 20 for a frequency analysis on the acquired sound signal, or to display a waveform obtained as a result of the frequency analysis on the sound signal acquired from the server apparatus 50 in the past together with the waveform obtained as a result of the frequency analysis result on the acquired sound signal.

The terminal devices 10a and 10b are different kinds of apparatuses and are different in the position of a microphone 17 to be described below, sensitivity of the microphone 17, hardware to be used, and software such as an operating system, for instance.

Hereinafter, in the present specification, when kinds of terminal devices are different from each other, the terminal devices are referred to as the terminal devices 10a and 10b. When functions or configurations are common despite the different kinds of apparatuses, the terminal devices are referred to as a terminal device 10.

The terminal devices 10 and the server apparatus 50 are connected to each other through a wireless LAN terminal 30 such as a Wi-Fi router or an Internet communication network 40, and transmit and receive information.

When the terminal device 10 is a mobile phone device or a smart phone, the terminal device 10 and the server apparatus 50 can be connected through a mobile phone line network to transmit and receive defect information.

In the diagnosis system according to this exemplary embodiment, when an abnormal sound is generated in the image forming apparatus 20 which is a target electronic apparatus installed in a place of the end user, the service engineer goes to the place of the image forming apparatus 20 with the terminal device 10. The service engineer records the generated sound using the terminal device 10 to acquire the sound signal, and performs diagnosis to specify a cause of the abnormal sound.

Further, it is also technically possible to provide a microphone in the image forming apparatus 20 to have a sound recording function so as to record the abnormal sound when the abnormal sound is generated. However, in a case where the image forming apparatus 20 is installed in an office of the end user, it may not be realized to provide the sound recording function in the image forming apparatus 20 due to a security problem.

Figure 2:
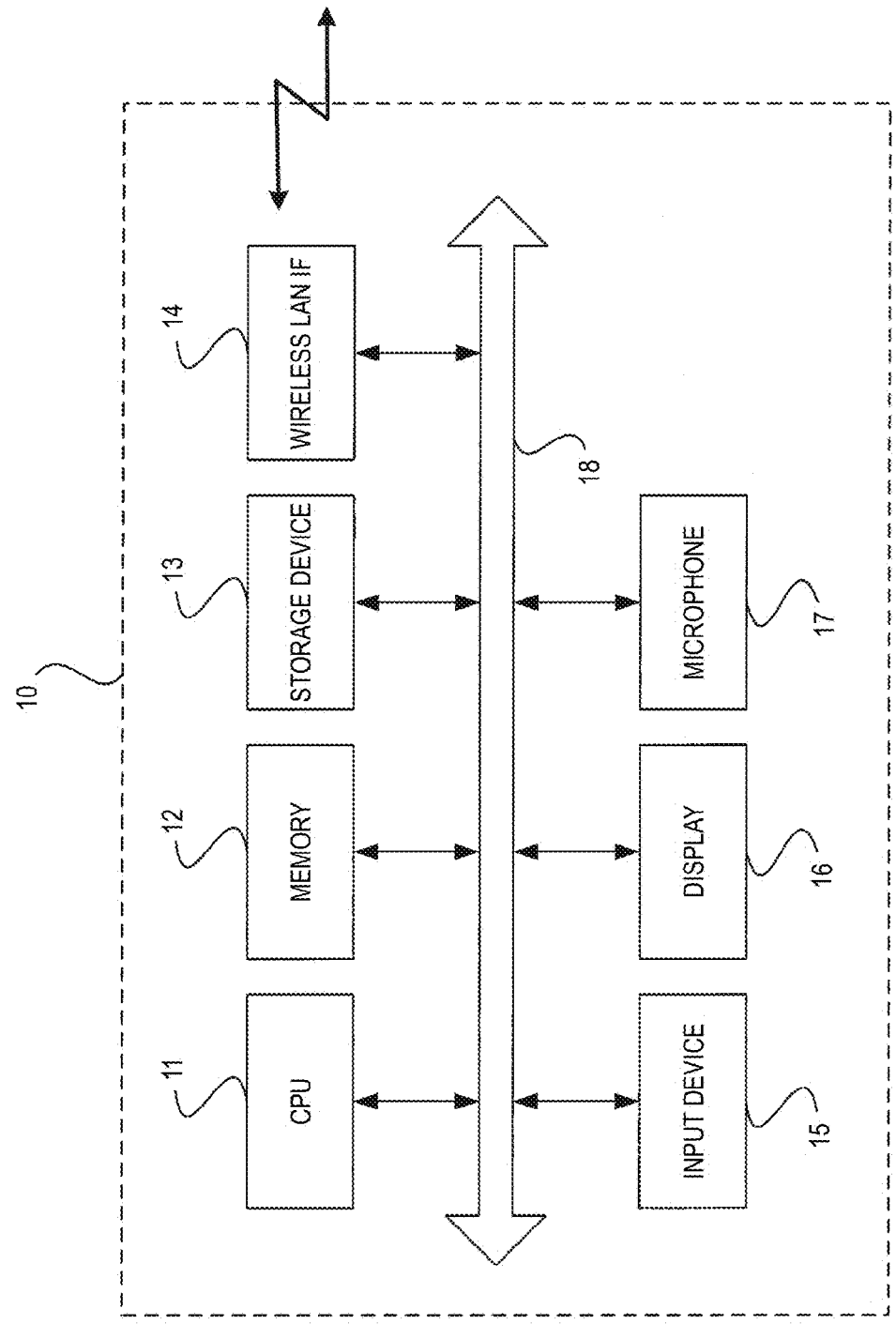
FIG. 2 is a block diagram illustrating a hardware configuration of a terminal device 10 according to the exemplary embodiment of the invention.

Next, a hardware configuration of the terminal device 10 in the diagnosis system according to the exemplary embodiment is illustrated in FIG. 2.

As illustrated in FIG. 2, the terminal device 10 includes a CPU 11, a memory 12 that can temporarily store data, a storage device 13 such as a flash memory, a wireless LAN interface (IF) 14 that performs wireless communication with the wireless LAN terminal 30 to transmit and receive data, an input device 15 such as a touch sensor, a display device 16, and the microphone 17. These components are interconnected through a control bus 18.

The terminal device 10 according to the exemplary embodiment includes a touch panel in which a touch sensor detecting a touch position on the display device 16 is provided as the input device 15, and thus display is performed and input is performed by the user, using the touch panel.

The CPU 11 controls the operation of the terminal device 10 by executing a predetermined process based on a control program stored in the memory 12 or the storage device 13. The control program can also be obtained by being downloaded the Internet communication network 40 or a mobile phone network and be provided to the CPU 11. Alternatively, the program can be stored in a storage medium such as a CD-ROM and provided to the CPU 11.

The microphone 17 detects a sound emanated from the image forming apparatus 20 which is an apparatus to be diagnosed. The output of the microphone 17 is input as sound data that is adjusted by a predetermined gain.

When the control program described above is executed, the terminal device 10 according to the exemplary embodiment performs an operation to be described below and supports service engineer's operation for specifying the generation cause of an abnormal sound.

Figure 3:
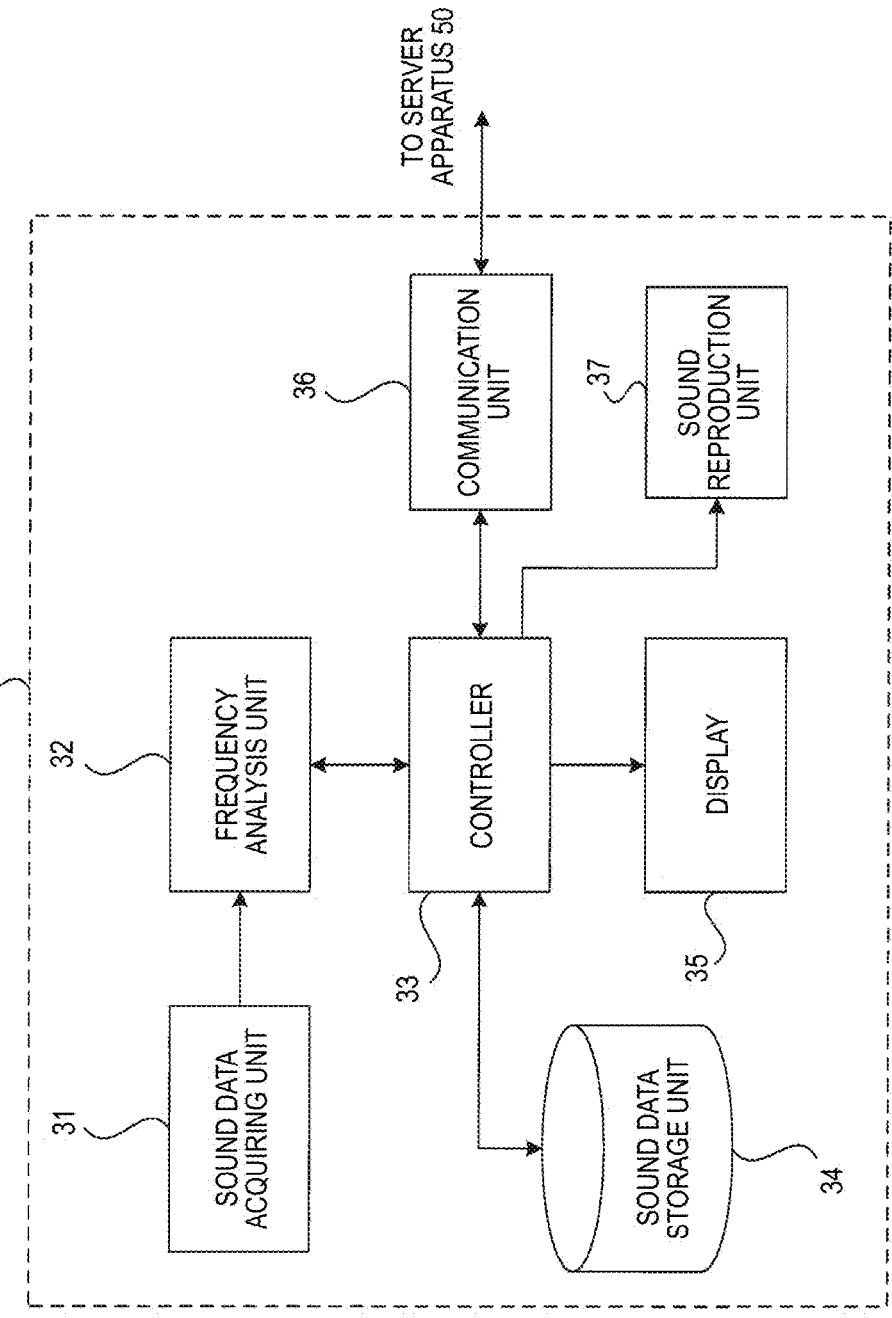
FIG. 3 is a block diagram illustrating a functional configuration of the terminal device 10 according to the exemplary embodiment of the invention.

FIG. 3 is a block diagram illustrating a functional configuration of the terminal device 10 realized by the execution of the control program.

As illustrated in FIG. 3, the terminal device 10 according to the exemplary embodiment includes a sound data acquiring unit 31, a frequency analysis unit 32, a controller 33, a sound data storing unit 34, a display 35, a communication unit 36, and a sound reproduction unit 37.

The display 35 displays various kinds of data based on the control of the controller 33. The communication unit 36 communicates with the server apparatus 50 which is an external device. The sound reproduction unit 37 reproduces recorded sound data and converts the sound data into a sound signal based on the control of the controller 33.

The sound data acquiring unit 31 receives a sound generated in the image forming apparatus 20, which is an analysis target apparatus, and acquires diagnosis data.

The frequency analysis unit 32 performs time-frequency analysis (time-dependent frequency analysis) of the diagnosis signal acquired by the sound data acquiring unit 31 and generates frequency spectrum waveform (a first frequency analysis result waveform) data representing a temporal change in a signal intensity distribution for each frequency of the acquired diagnosis signal.

Specifically, the frequency analysis unit 32 generates the frequency spectrum waveform data by performing a short time Fourier transform (STFT) of the sound signal acquired by the sound data acquiring unit 31.

The controller 33 stores the frequency spectrum waveform data obtained by the frequency analysis unit 32 together with the sound data in the sound data storing unit 34.

The controller 33 instructs the frequency analysis unit 32 to perform a fast Fourier transform (1D-FFT) in order to perform frequency analysis on a frequency component estimated to be an abnormal sound in the frequency spectrum waveform data obtained by the frequency analysis unit 32 in a time axis direction.

Here, the controller 33 extracts a signal component having a periodicity out of frequency spectrum waveform data and thus may select the signal component as a signal component having a high possibility of an abnormal sound. The controller 33 displays the obtained frequency spectrum data on the display 35 to control a user to designate a frequency having a high possibility of an abnormal sound when viewing the frequency spectrum waveform, and may select the frequency component as a signal component having a high possibility of an abnormal sound.

The frequency analysis unit 32 performs the fast Fourier transform in the time-axial direction with respect to a frequency component, which is estimated to be the abnormal sound, based on the instruction of the controller 33.

The controller 33 acquires information on a period and a frequency of the abnormal sound from the analysis result of the fast Fourier transform in the frequency analysis unit 32.

The controller 33 transmits the acquired information of the period and the frequency of the abnormal sound to the server apparatus 50 through the communication unit 36 together with model information such as a model name and a serial number of the image forming apparatus 20, and operating state information indicating an operating state of the image forming apparatus 20. Specifically, the operation state information can include information regarding whether printing is color printing or monochrome printing, whether printing is duplex printing or simplex printing, whether an operation mode is scanning, printing, or copying, and a kind of use sheet. In this way, the controller 33 transmits the information obtained from the frequency spectrum waveform data which is obtained by the frequency analysis unit 32 to the server apparatus 50 through the communication unit 36.

The server apparatus 50 stores the spectrum waveform data obtained through the frequency analysis on sound signals of abnormal sounds generated in the past in an apparatus as equivalent to the image forming apparatus 20 together with information such as original sound data, an operating state of the apparatus at the time of acquisition of the sound data, a cause of the abnormal sound, and a countermeasure for the for the abnormal sound.

The server apparatus 50 retrieves the frequency spectrum waveform (a waveform of a second frequency analysis result) data corresponding to the frequency spectrum waveform data obtained as a result of the frequency analysis by the frequency analysis unit 32 from the information on the period and the frequency of the abnormal sound transmitted from the terminal device 10. The server apparatus 50 transmits the frequency spectrum waveform data thus found to the terminal device 10 together with the information such as the sound data stored as sample waveform data of the abnormal sound.

As a result, the controller 33 receives the frequency spectrum waveform data corresponding to the frequency spectrum waveform data obtained as a result of the frequency analysis performed by the frequency analysis unit 32 from the server apparatus 50 through the communication unit 36.

The controller 33 controls the display 35 to display the frequency spectrum waveform obtained through the frequency analysis of the sound signal acquired by the sound data acquiring unit 31, and the spectrum waveform received from the server apparatus 50 in parallel manner.

At this time, based on a user's operation, the controller 33 changes a display position in the time-axial direction of one of the frequency spectrum waveform obtained through the frequency analysis of the sound signal acquired by the sound data acquiring unit 31 and the spectrum waveform transmitted from the server apparatus 50.

The controller 33 may change the display position in the time-axis direction of at least one of two frequency spectrum waveforms such that the periodic waveform position of the frequency spectrum waveform obtained through the frequency analysis of the diagnostic data acquired by the sound data acquiring unit 31 matches that of the spectrum waveform transmitted from the server apparatus 50.

Either one of the frequency spectrum waveform obtained through the frequency analysis of the diagnostic data acquired by the sound data acquiring unit 31 and the spectrum waveform transmitted from the server apparatus 50 is set to be the waveform having a longer period of time than the other waveform.

In this exemplary embodiment, as an instance, the frequency spectrum waveform obtained through the frequency analysis of the diagnostic data acquired by the sound data acquiring unit 31 has data of about 4 to 16 seconds, and the frequency spectrum waveform transmitted from the server apparatus 50 has data of about 8 seconds.

In a case where there are plural frequency spectrum waveform data transmitted from the server apparatus 50, the controller 33 controls the display 35 such that data having a high degree of similarity to the frequency spectrum waveform data obtained through the frequency analysis of the frequency analysis unit 32 is displayed by priority among the plural frequency spectrum waveform data.

Furthermore, when either one of the frequency spectrum waveform obtained through the frequency analysis of the sound signal acquired by the sound data acquiring unit 31 and the spectrum waveform transmitted from the server apparatus 50 is enlarged or reduced, the controller 33 enlarges or reduces the other waveform to have the same size.

When a process speed (image forming speed) of the image forming apparatus 20 at the time of acquisition of the waveform of the sound is different from a process speed of the image forming apparatus at the time of acquisition of the frequency spectrum waveform transmitted from the server apparatus 50, the controller 33 may extend or reduce the length in the time-axis direction of the frequency spectrum waveform transmitted from the server apparatus 50 according to two process speeds.

This is because the period of the abnormal sound to be generated also varies when the process speed varies and thus correct comparison cannot be performed in a case of comparison without a change. The reason of acquiring and preparing diagnostic data for each of several process speeds is that the amount of data becomes larger and a labor of acquiring the diagnostic data becomes also increase.

When the user instructs reproduction of the sound data, according to the control of the controller 33, the sound reproduction unit 37 may reproduce the sound data acquired by the diagnostic data sound data acquiring unit 31 and the sound data corresponding to the frequency spectrum waveform transmitted from the server apparatus 50 as a left signal and a right signal of stereophonic reproduction, respectively.

In order to facilitate the comparison of two frequency spectrum waveforms, the controller 33 may display an adjustable frequency-auxiliary line indicating the same frequency and an adjustable common time-axis auxiliary line used to compare positions in the time-axis direction in a superimposed manner, on two frequency spectrum waveform displayed in parallel.

Next, a functional configuration of the server apparatus 50 in the abnormal sound diagnosis system according to this exemplary embodiment will be described with reference to a block diagram of FIG. 4.

Figure 4:
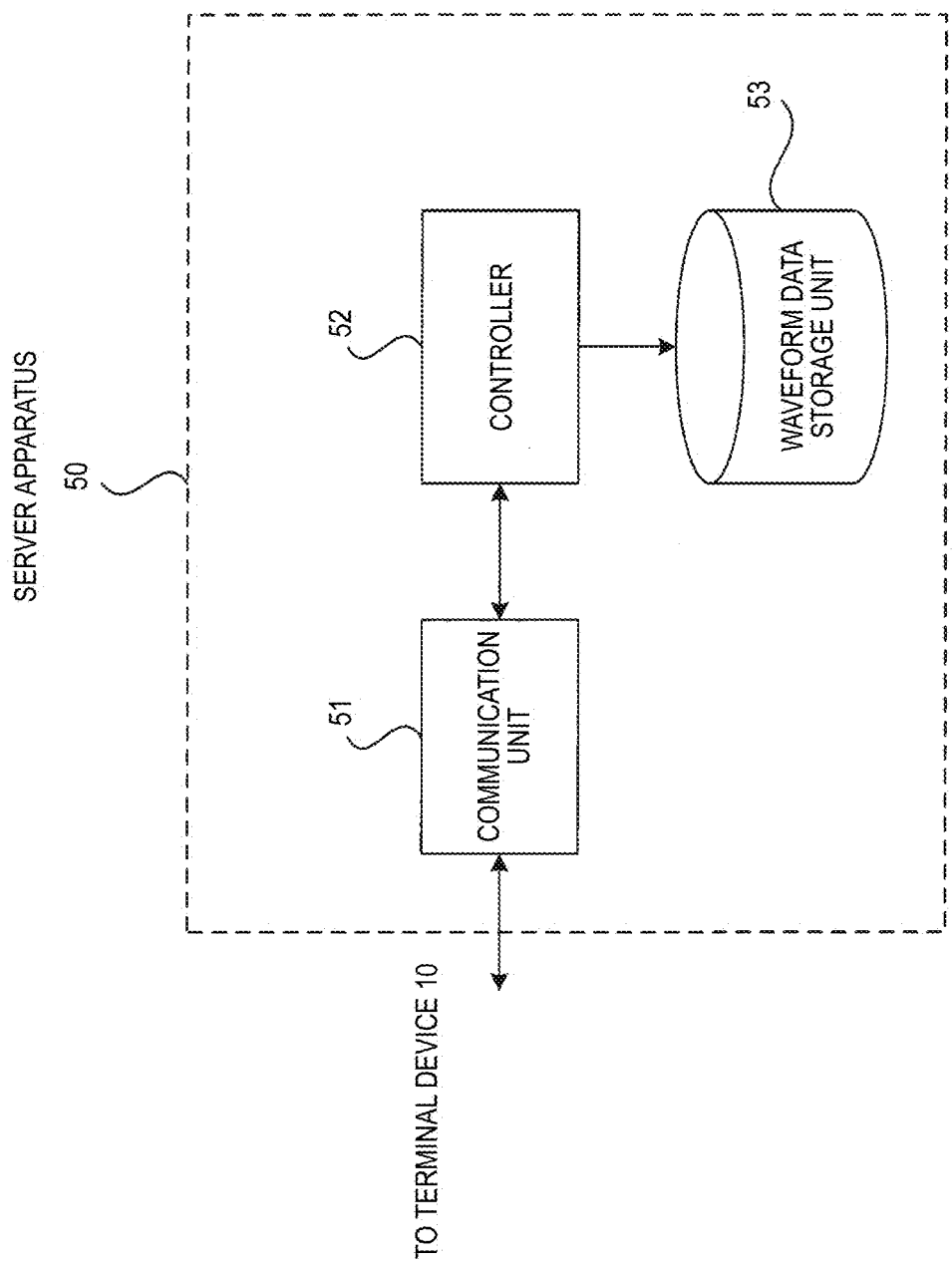
FIG. 4 is a block diagram illustrating a functional configuration of a server apparatus 50 according to the exemplary embodiment of the invention.

The server apparatus 50 of this exemplary embodiment is provided with a communication unit 51, a controller 52, and a waveform data storing unit 53 as illustrated in FIG. 4.

The waveform data storing unit 53 stores plural pieces of frequency spectrum waveform data obtained through the frequency analysis on the abnormal sound generated in the past in an apparatus equivalent to the image forming apparatus 20 that is an analysis target apparatus.

Specifically, the waveform data storing unit 53 stores information such as frequency spectrum waveform data obtained through the time frequency analysis on the sound data acquired in advance, the original sound data, a cause of the abnormal sound, and a countermeasure thereof for each model as illustrated in FIG. 5.

In a case where the information of the period and the frequency of the abnormal sound is received from the abnormal sound diagnosis apparatus 10, the controller 52 selects waveform data similar to the waveform data of the frequency spectrum based on the abnormal sound acquired in the abnormal sound diagnosis apparatus 10 from among the waveform data of the plural of frequency spectrums stored in the waveform data storing unit 53 based on the received information of the period and the frequency of the abnormal sound. The controller 52 transmits the selected waveform data to the abnormal sound diagnosis apparatus 10 through the communication unit 51.

In the exemplary embodiment, the terminal device 10 executes the STFT or the fast Fourier transform on the sound data of the abnormal sound and transmits the information regarding the period and frequency of the abnormal sound to the server apparatus 50, as described above. However, the fast Fourier transform or the STFT may be executed on the side of the server apparatus 50.

In this case, the sound data is directly transmitted to the server apparatus 50 from the terminal device 10, the frequency spectrum waveform data obtained by the STFT on the sound data is transmitted, and the server apparatus 50 executes the STFT or the fast Fourier transform on the sound data.

Figure 7:
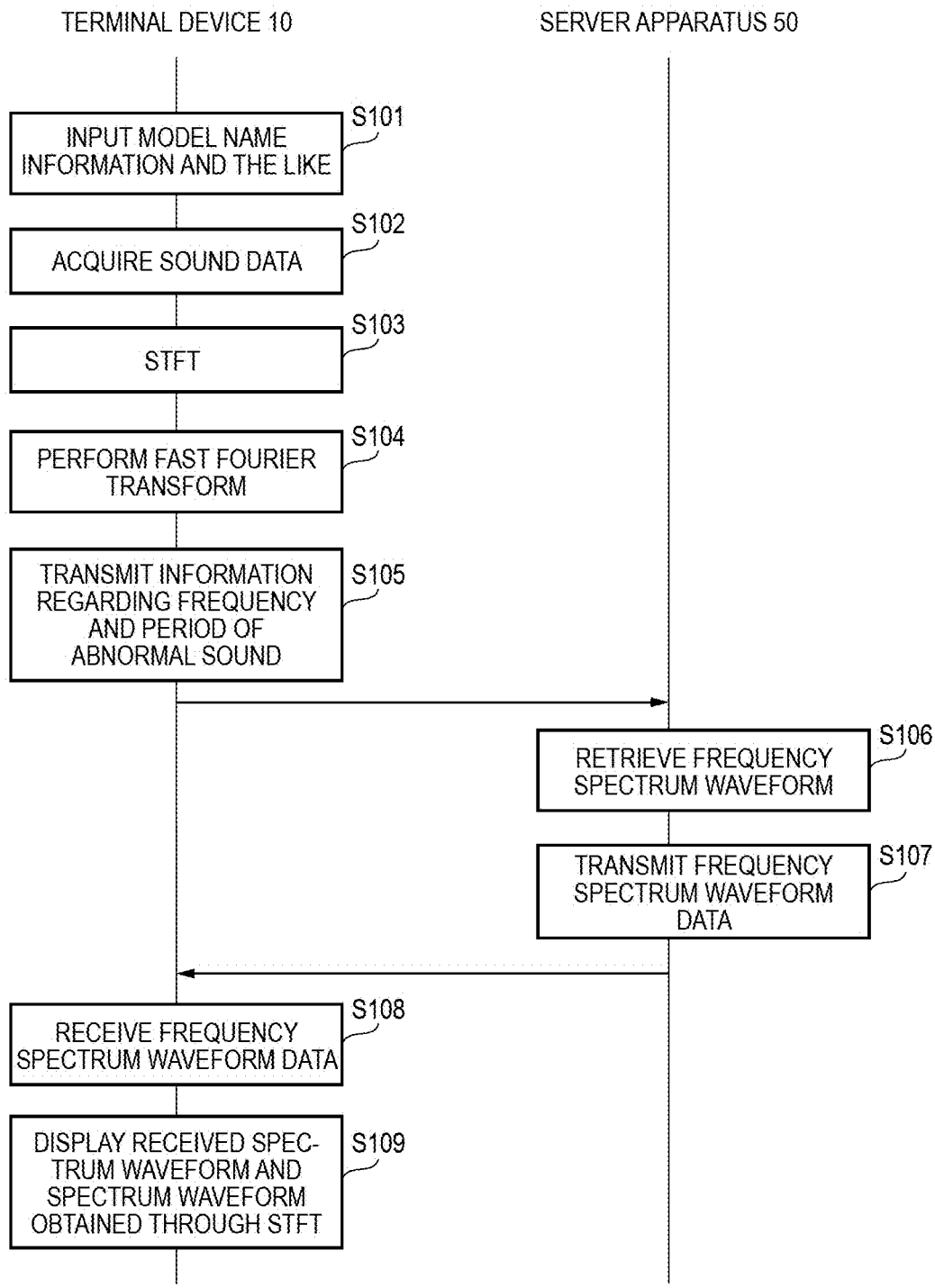
FIG. 7 is a sequence chart illustrating an operation of the diagnosis system according to the exemplary embodiment of the invention.

Next, the operation of the abnormal sound diagnosis system according to this exemplary embodiment will be described with reference to a sequence chart illustrated in FIG. 7.

Figure 6:
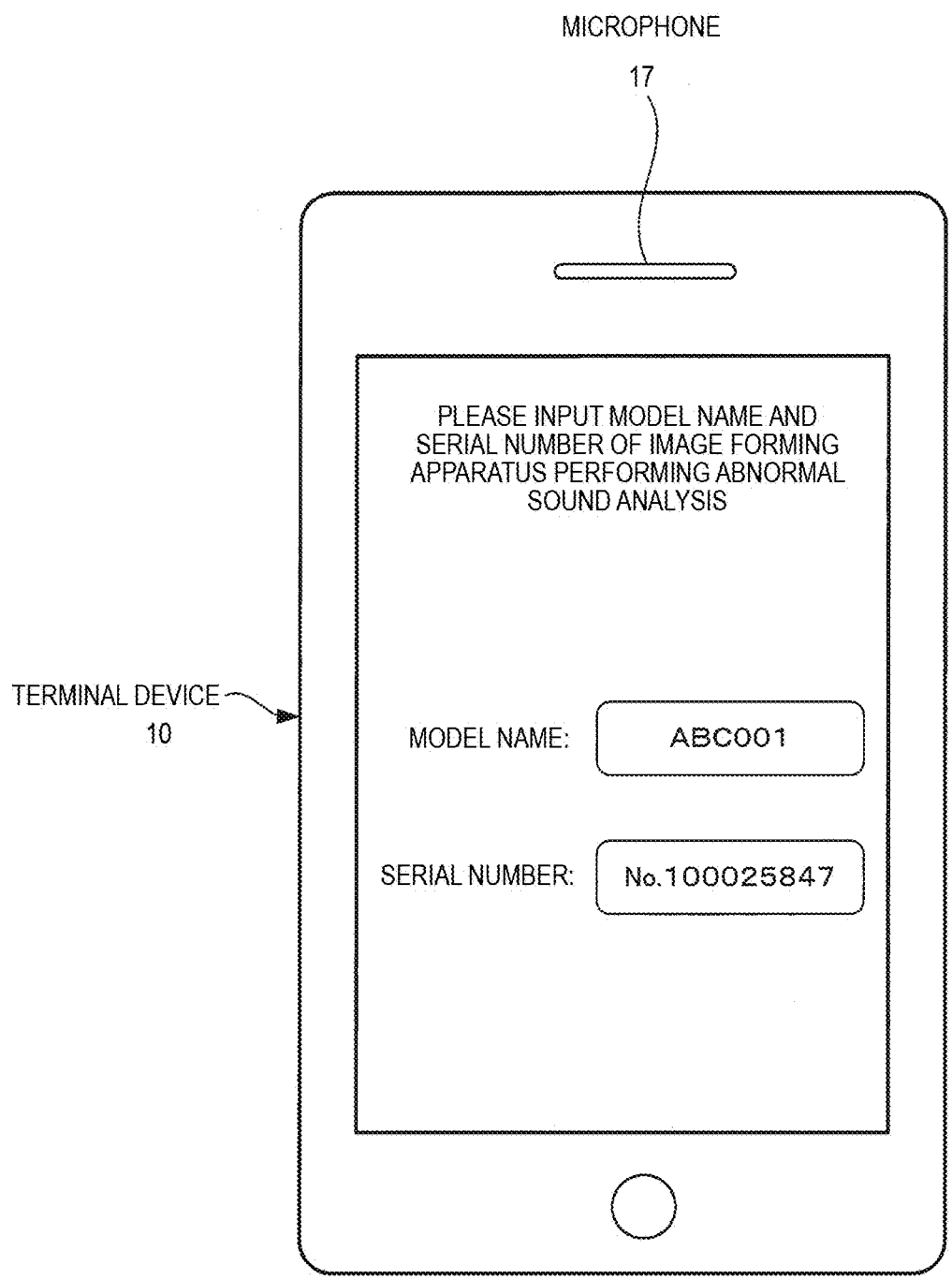
FIG. 6 is a diagram illustrating an exemplary screen used to input models for performing abnormal sound diagnosis.

In a case where the abnormal sound terminal device 10 performs an abnormal diagnosis to specify a cause of the abnormal sound, an image as illustrated in FIG. 6 is displayed, and various types of information such as a model name, a serial number, and an operating state are input (Step S101).

The terminal device 10 sets the operation mode to a recording mode and performs the recording by causing the microphone 17 to approach a place where the abnormal sound is generated in the image forming apparatus 20, thereby acquiring the diagnostic data (Step S102).

The holding of the microphone 17 toward the image forming apparatus 20 needs experience. Therefore, the present terminal device 10 is prepared with a program for guiding how to hold the terminal device 10 at any position. The details of the program will be described below.

Next, in the terminal device 10, the frequency analysis unit 32 performs the STFT on the acquired sound data to generate the frequency spectrum waveform indicating the temporal change in distribution of the signal intensity for each frequency (Step S103).

Figure 8:
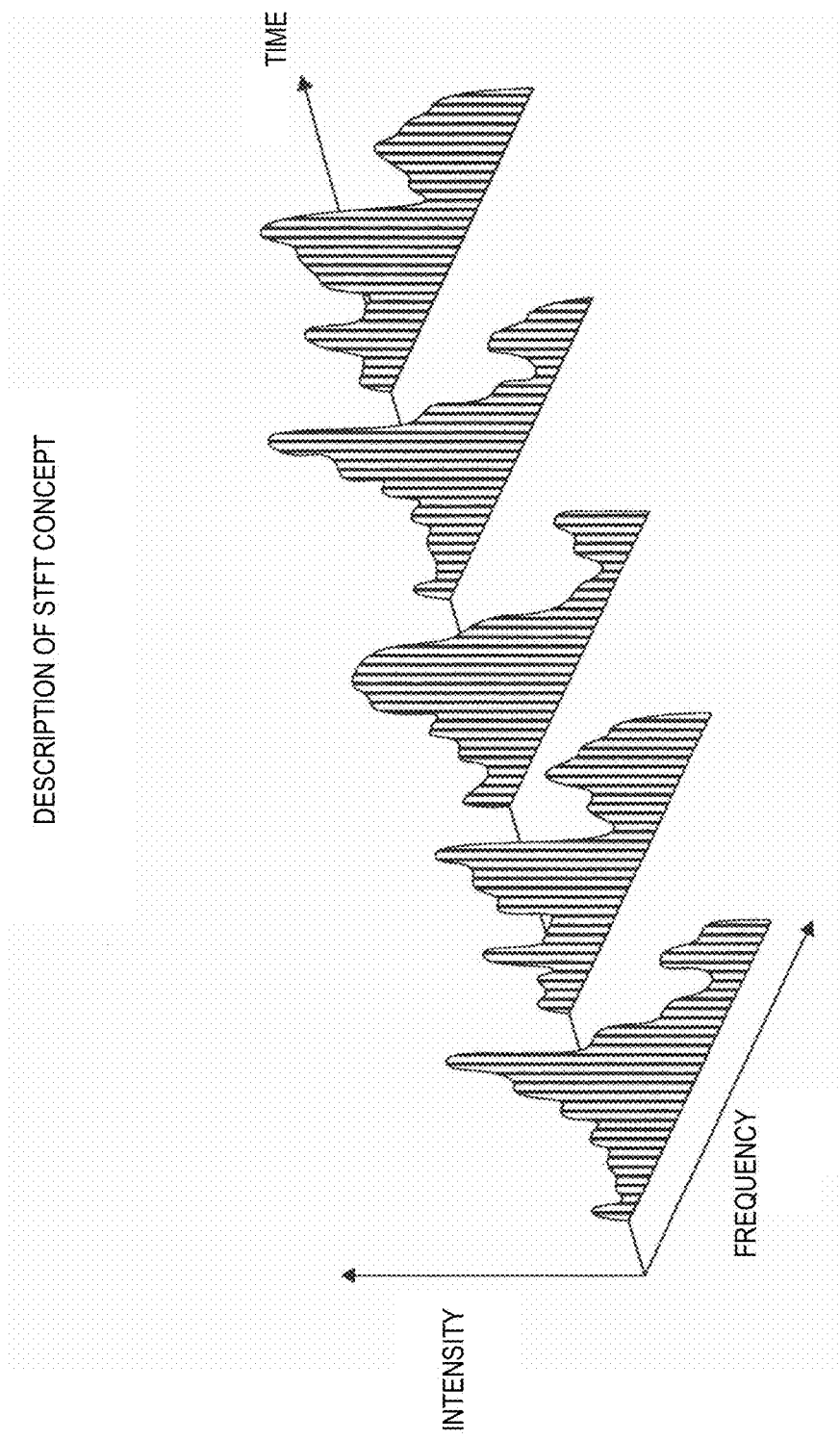
FIG. 8 is a diagram illustrating a concept of an STFT.
Figure 9:
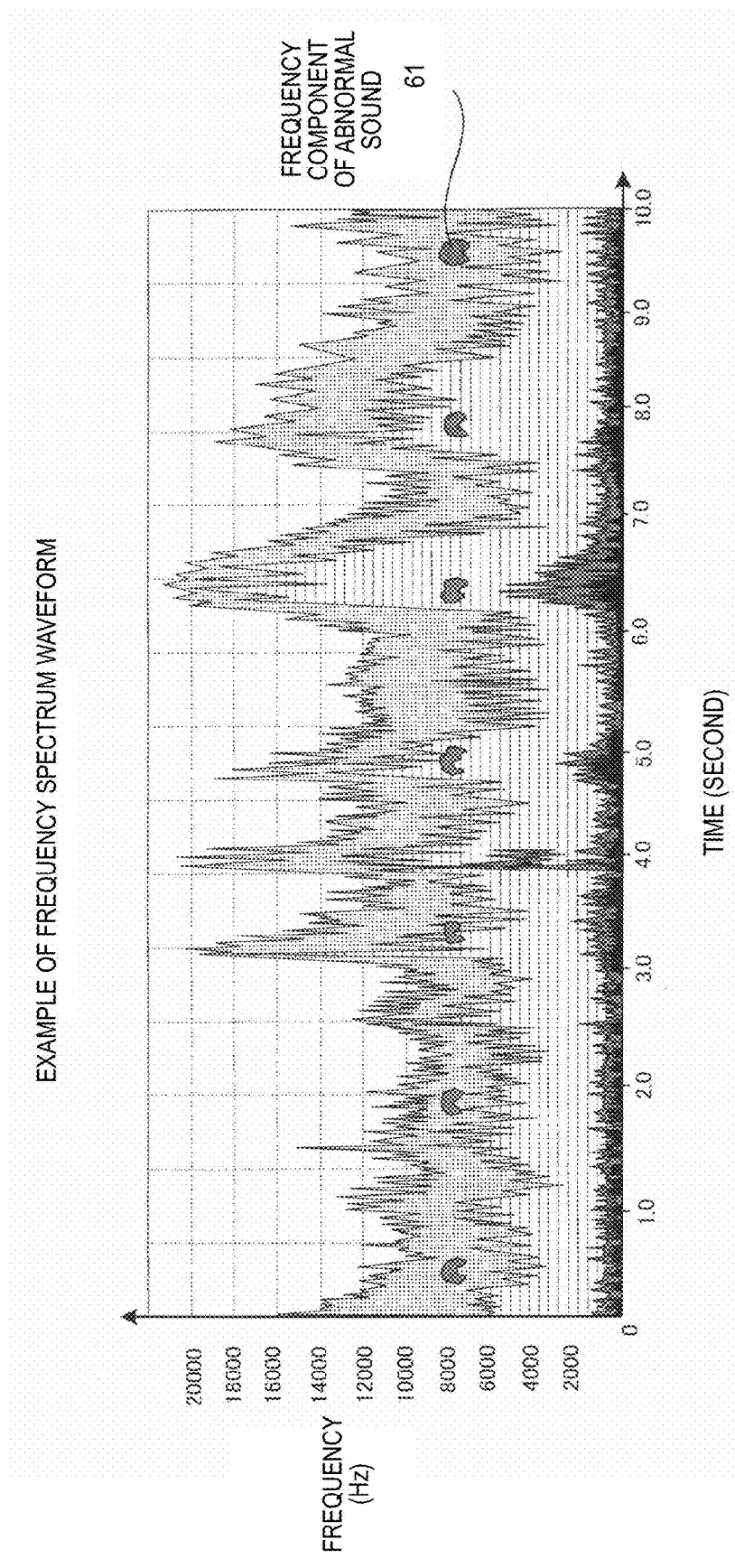
FIG. 9 is a diagram illustrating an instance of an image of a frequency spectrum waveform based on an analysis result obtained through the STFT.

In the STFT, the Fourier transform is performed for every short time as illustrated in FIG. 8 to calculate the signal intensity according to the temporal change for each frequency component. FIG. 9 illustrates an instance of a waveform in a case where an image of each frequency spectrum waveform is obtained as an analysis result of the STFT.

In the instance of the frequency spectrum waveform illustrated in FIG. 9, the horizontal axis represents the time, the vertical axis represents the frequency, and intensity for each frequency is represented using a color. In FIG. 9, a difference in color is represented using hatching patterns. In addition, FIG. 9 illustrates an instance in a case where the intensity for each frequency is represented using a color, and the intensity may be represented using a gray scale.

In the instance of the frequency spectrum waveform illustrated in FIG. 9, it can be seen that a frequency component 61 of the abnormal sound is periodically generated to be displayed at a specific frequency. In the instance of the frequency spectrum waveform illustrated in FIG. 9, a low frequency component is a normal operation sound but is not a frequency component of the abnormal sound.

When the frequency spectrum waveform as illustrated in FIG. 9 is obtained, the controller 33 displays the frequency spectrum waveform on the display 35. Then, the user who is represented with the frequency spectrum waveform specifies the frequency component 61 of the abnormal sound. For instance, the user selects an area where the frequency component 61 of the abnormal sound is included by operating the touch panel.

Figure 10:
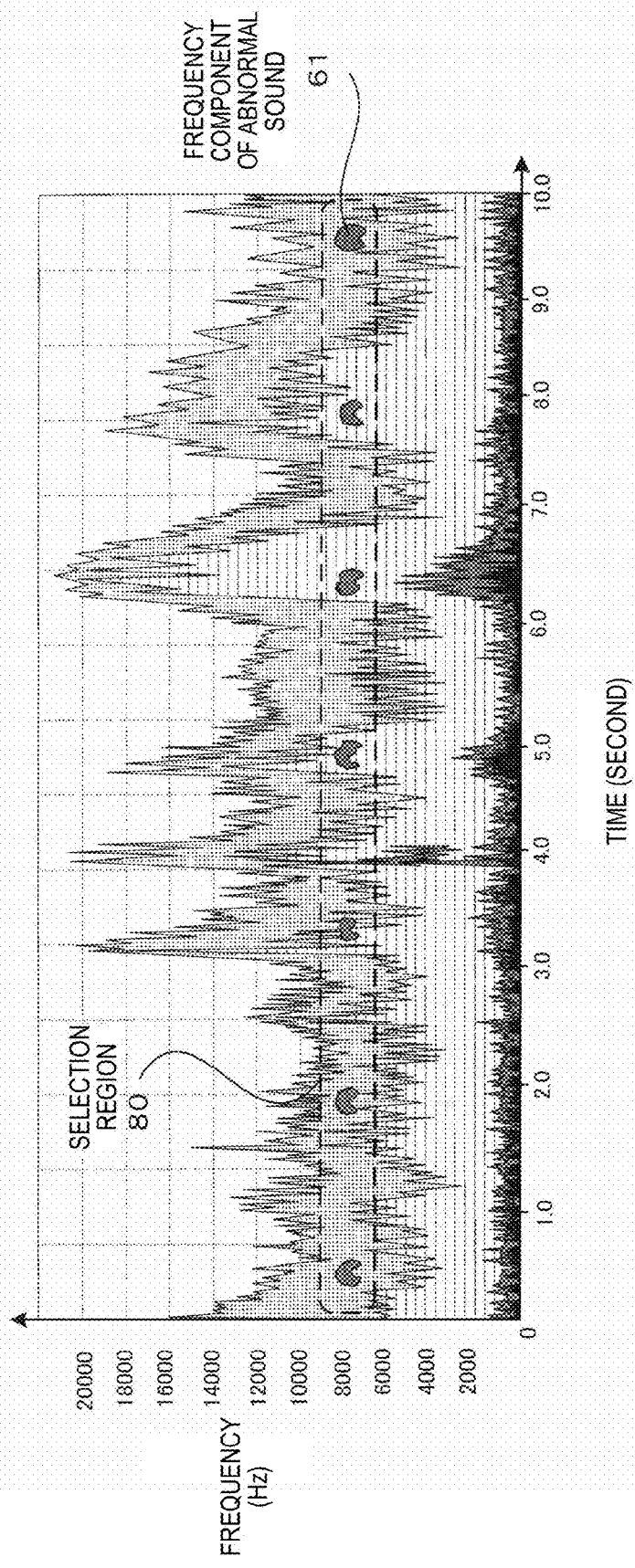
FIG. 10 is a diagram illustrating an instance of a selection region 80 selected by the user in an instance of the image of the frequency spectrum waveform of FIG. 9.

An instance of a selection region 80 selected by the user as described above is illustrated in FIG. 10. In the instance illustrated in FIG. 10, it can be seen that a rectangular area containing the frequency component 61 of plural abnormal sounds is designated as the selection region 80.

When the selection region 80 is designated as described above, the fast Fourier transform (1D-FFT) is performed on the frequency component contained in the selection region 80 by the frequency analysis unit 32 (Step S104). An exemplary analysis result of the fast Fourier transform performed as described above is illustrated in FIG. 11.

Figure 11:
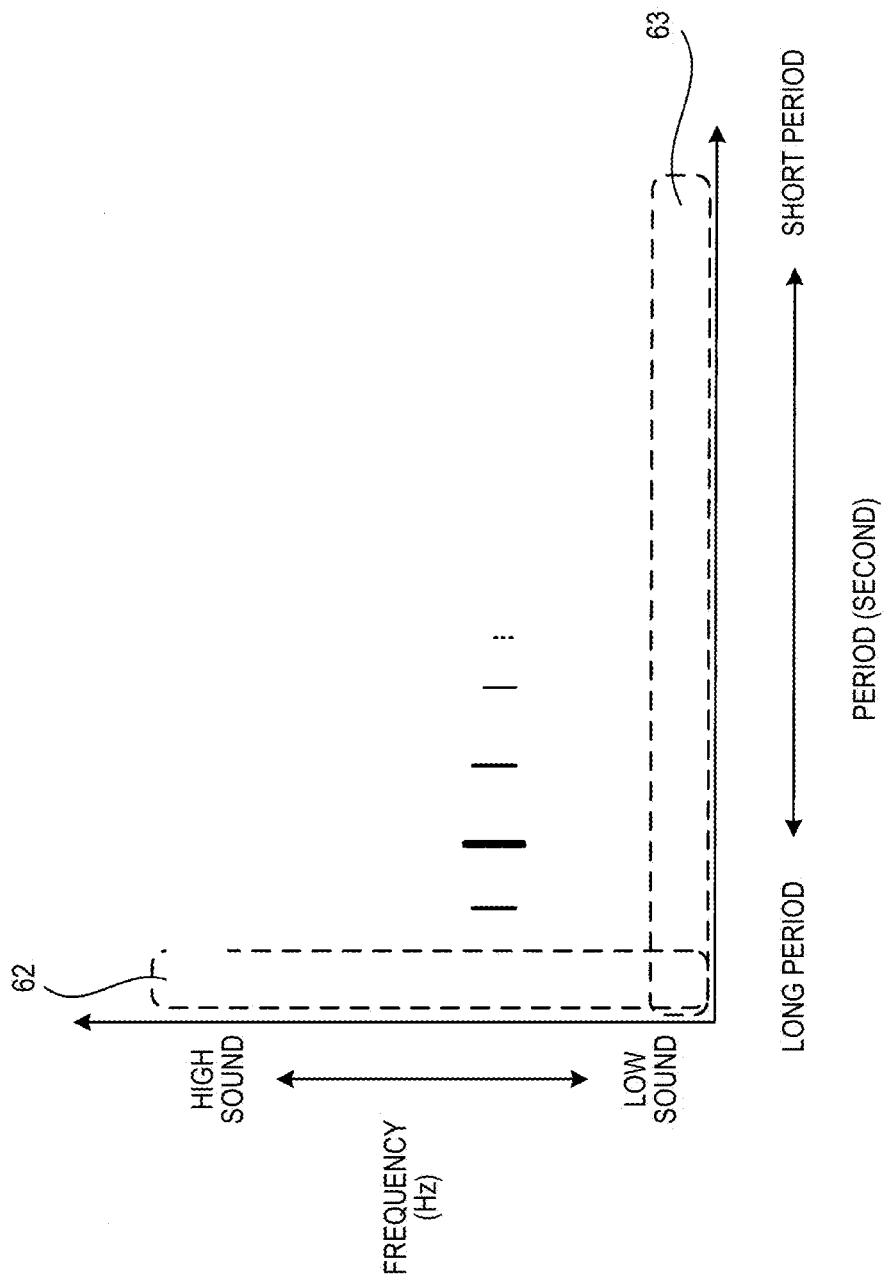
FIG. 11 is a diagram illustrating an instance of an analysis result of a fast Fourier transform.

In FIG. 11, the period and the frequency of the abnormal sound are specified by detecting the period and the frequency of the signal of the frequency component on which the fast Fourier transform is performed. Since the abnormal sound contains harmonic components, there may be detected plural of periods. However, a period of the strongest signal intensity is detected as the period of the abnormal sound.

In addition, a signal component having a long period equal to or more than a predetermined period is considered as of a normal operation sound or of a noise having no fixed period. Therefore, the area of such a long period signal component is set to an out-of-determination area 62, and the analysis result in the out-of-determination area 62 is ignored.

Furthermore, a signal component having a low frequency equal to or less than a predetermined frequency is also not distinguished from the normal operation sound. Therefore, the area of such a low frequency signal component is set to an out-of-determination area 63, and the analysis result in the out-of-determination area 63 is ignored.

The terminal device 10 transmits the information of the period and the frequency of the abnormal sound obtained as an analysis result of the fast Fourier transform to the server apparatus 50 together with the model information and the information of the operating state (Step S105). For instance, the information indicating that the frequency of the abnormal sound is 4 kHz and the period of the abnormal sound is 2.0 seconds is transmitted to the server apparatus 50.

The server apparatus 50 retrieves the waveform data storing unit 53 based on the received information to extract the data of the frequency spectrum waveform corresponding to the received information (Step S106).

The server apparatus 50 transmits the extracted frequency spectrum waveform data to the terminal device 10 together with the information such as the original sound data, the cause of the abnormal sound, and the countermeasure thereof (Step S107).

The terminal device 10 receives the frequency spectrum waveform data which is transmitted from the server apparatus 50 (Step S108). The controller 33 of the terminal device 10 displays he received frequency spectrum waveform and the frequency spectrum waveform obtained through the STFT on the display 35 (Step S109).

Figure 12:
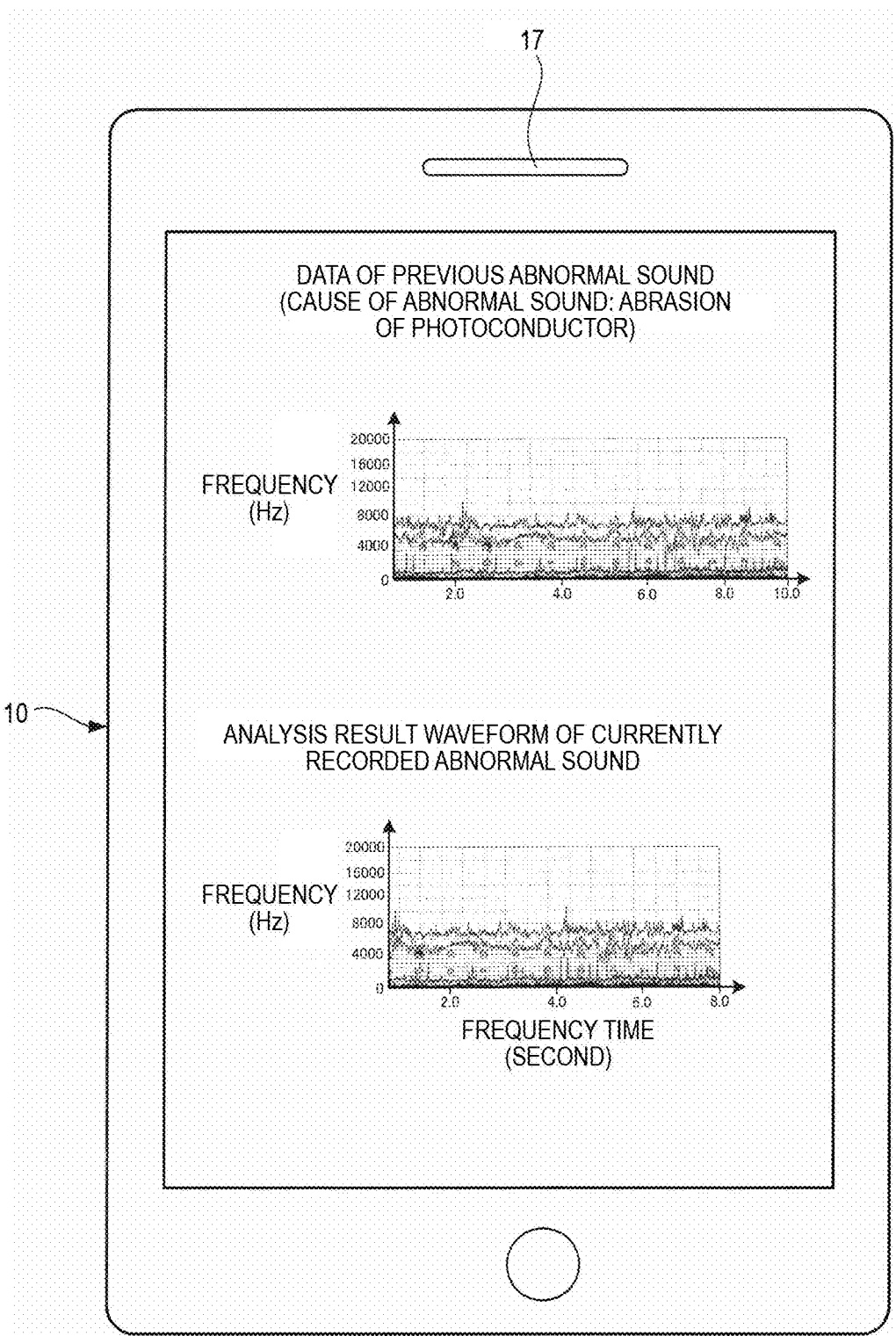
FIG. 12 is a diagram illustrating an instance of a screen of the terminal device 10 in which two frequency spectrum waveforms are displayed.

FIG. 12 illustrates an exemplary screen of the terminal device 10 on which the two frequency spectrum waveforms are displayed in this way.

In the exemplary screen illustrated in FIG. 12, it can be seen that the frequency spectrum waveform obtained through the STFT in the frequency analysis unit 32 is displayed as "Analysis resultant waveform of recorded abnormal sound this time", and the frequency spectrum waveform transmitted from the server apparatus 50 is displayed as "Sound data in the past" together with "Abrasion of the photoconductor" as a cause of the abnormal sound.

The service engineer who diagnoses the abnormal sound compares these two frequency spectrum waveforms to determine whether the abnormal sound components in the waveforms are similar to each other, and specifies a cause of the abnormal sound.

A program for guiding how to hold the terminal device 10 during the recording at any position to the service engineer to attempt a diagnosis will be described.

Figure 13:
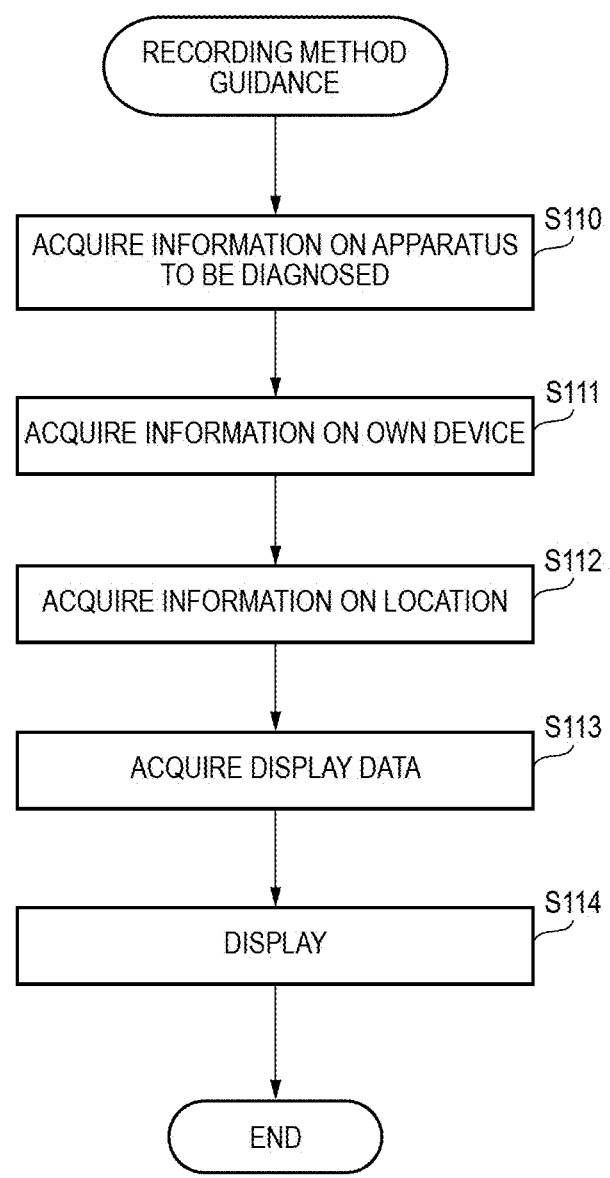
FIG. 13 is a flowchart illustrating an operation flow of recording method guidance in the terminal device 10

FIG. 13 is a flowchart for guiding the recording method.

First, information on an apparatus to be diagnosed (image forming apparatus 20 in this exemplary embodiment) is acquired in step S110. For instance, a model is specified from a model name (ABC001 in FIG. 6) input in step S101 described above, and corresponding model information is acquired.

In the subsequent step S111, information on the terminal device 10a or 10b which is a user device is acquired. The information includes, for instance, disposition information of the microphone 17 and sensitivity information of the microphone 17. The information of the terminal device is stored in the memory 12 and the storage device 13, but may be acquired from the server apparatus 50 through the Internet communication network 40, for instance.

Figure 14:
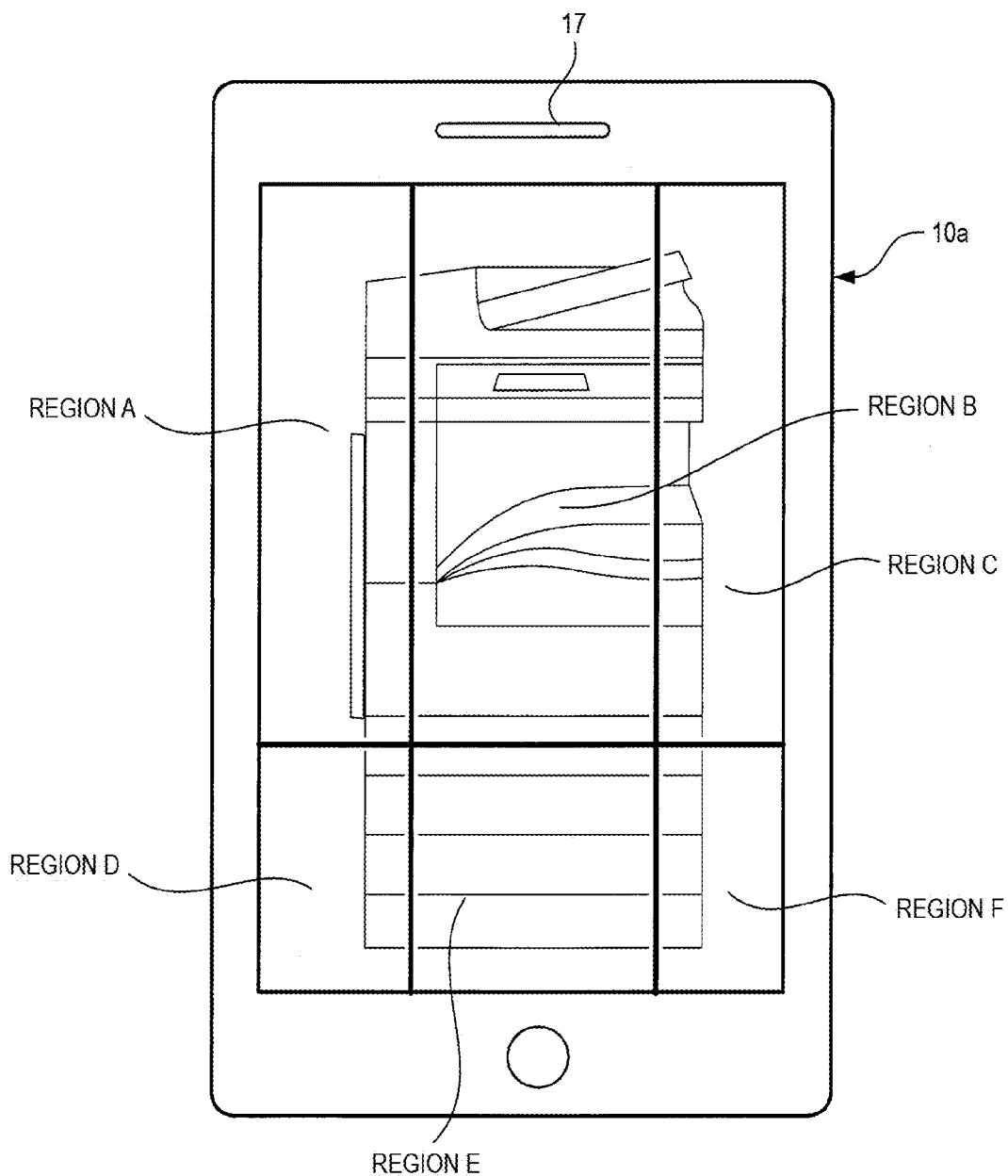
FIG. 14 is a diagram illustrating an exemplary display when a location of the terminal device 10 is designated.

In the next step S112, information on a location to be recorded is acquired. For instance, as illustrated in FIG. 14, images of the image forming apparatus 20 are divided and displayed into six regions A to F in the terminal device 10. The service engineer to attempt the recording selects one region, for instance, the region B while listening the situation of the abnormal sound emanated from the image forming apparatus 20. The selected region is accepted as information of the location.

In the next step S113, display data is acquired from the information on the apparatus to be diagnosed, the information on the user device, and the information on the location that are acquired in steps S110, 111, and 112, respectively.

In the subsequent step S114, a display image is generated based on the display data acquired in step S113 and is displayed on the display of the terminal device 10a or 10b, and then the process ends. The display image may be generated by the server apparatus 50, or may be generated by the terminal device 10.

Figure 15:
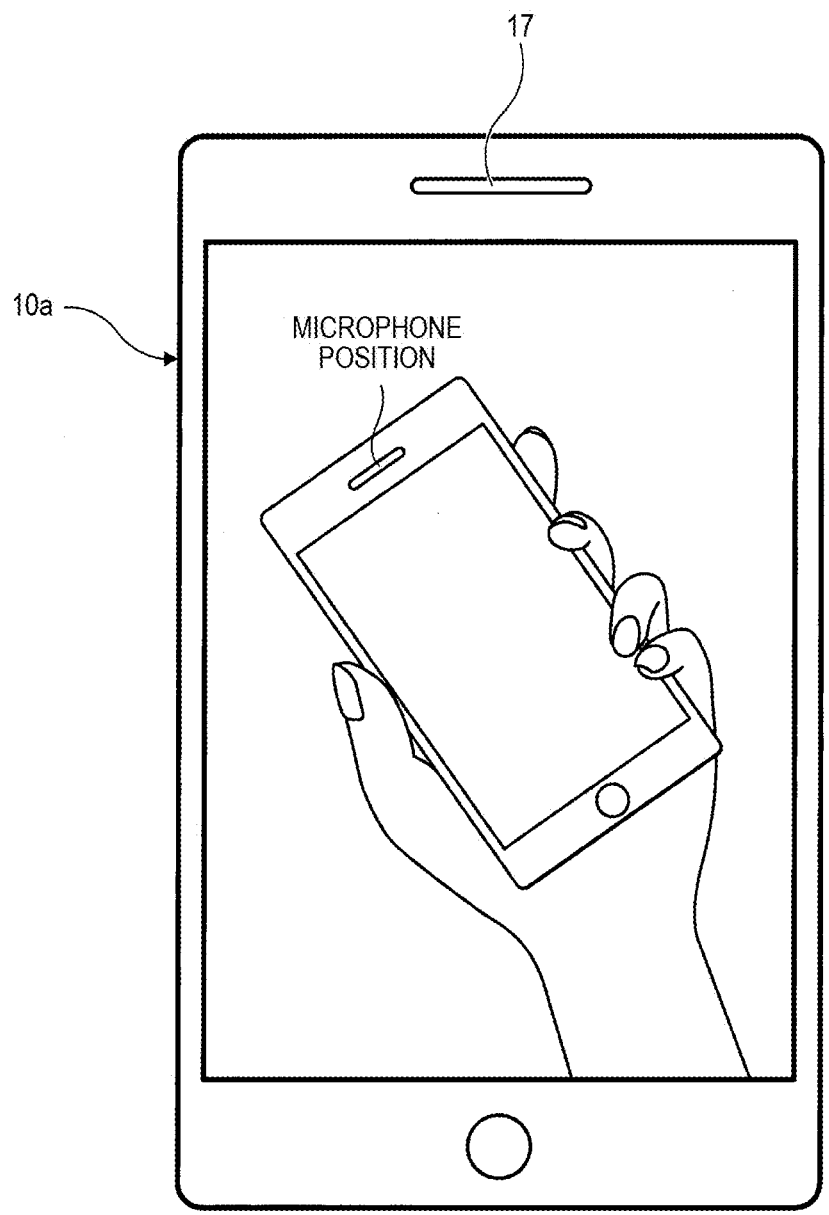
Figure 16:
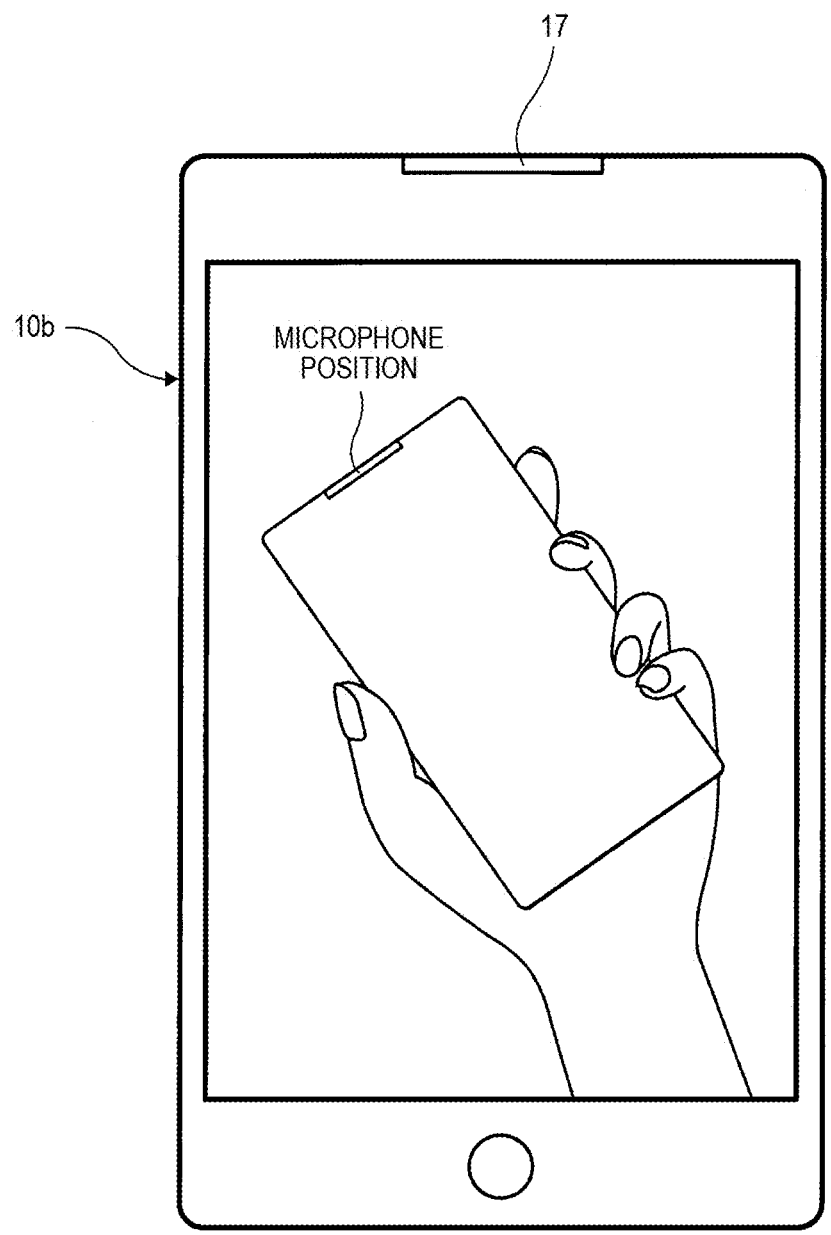
FIG. 16 is a diagram illustrating a first exemplary display for a recording method in a terminal device 10b.

FIGS. 15 and 16 are diagrams illustrating a first display instance of the terminal devices 10a and 10b. As illustrated in FIG. 15, the terminal device 10a has an outer appearance in which the front surface (the surface on which the display is disposed) of the terminal device 10a is located at an upper portion. The microphone 17 of the terminal device 10a is disposed in the upper portion of the front surface and "microphone position" is displayed at the upper portion. Since the microphone 17 is disposed at the upper portion of the front surface, it is illustrated that the lower portion of the terminal device 10a is held from the lower side so that the microphone 17 is not hidden by a hand of the user.

On the other hand, as illustrated in FIG. 16, the terminal device 10b has an outer appearance in which the rear surface (the surface on which the display is not disposed) of the terminal device 10b is located at an upper portion. The microphone 17 of the terminal device 10b is disposed at the upper portion of the rear surface and "microphone position" is displayed at the upper portion. Since the microphone 17 is disposed in the upper portion of the rear surface, it is illustrated that the lower portion of the terminal device 10b is held from the lower side so that the microphone 17 is not hidden by a hand of the user.

For instance, as illustrated in FIG. 17, a recording method guide list is stored in the server apparatus 50. For instance, in a case where the recording is performed at the location B with respect to the model ABC001 by the terminal device 10a, the fact that a distance of 10 cm, a horizontal angle, and an upper direction are set and photo 12 is selected is stored. When the display data is transmitted to the terminal devices 10, the terminal device 10a acquires the display data. When the terminal device 10b is used and a sound is recorded in location B with respect to the same model ABC001, the fact that a distance of 5 cm, a horizontal angle, and a lower direction are set and photo 21 is selected is stored.

That is, since the terminal devices 10a and 10b are different kinds of devices, the list is stored so that the appropriate recording guidance is achieved.

Figure 18:
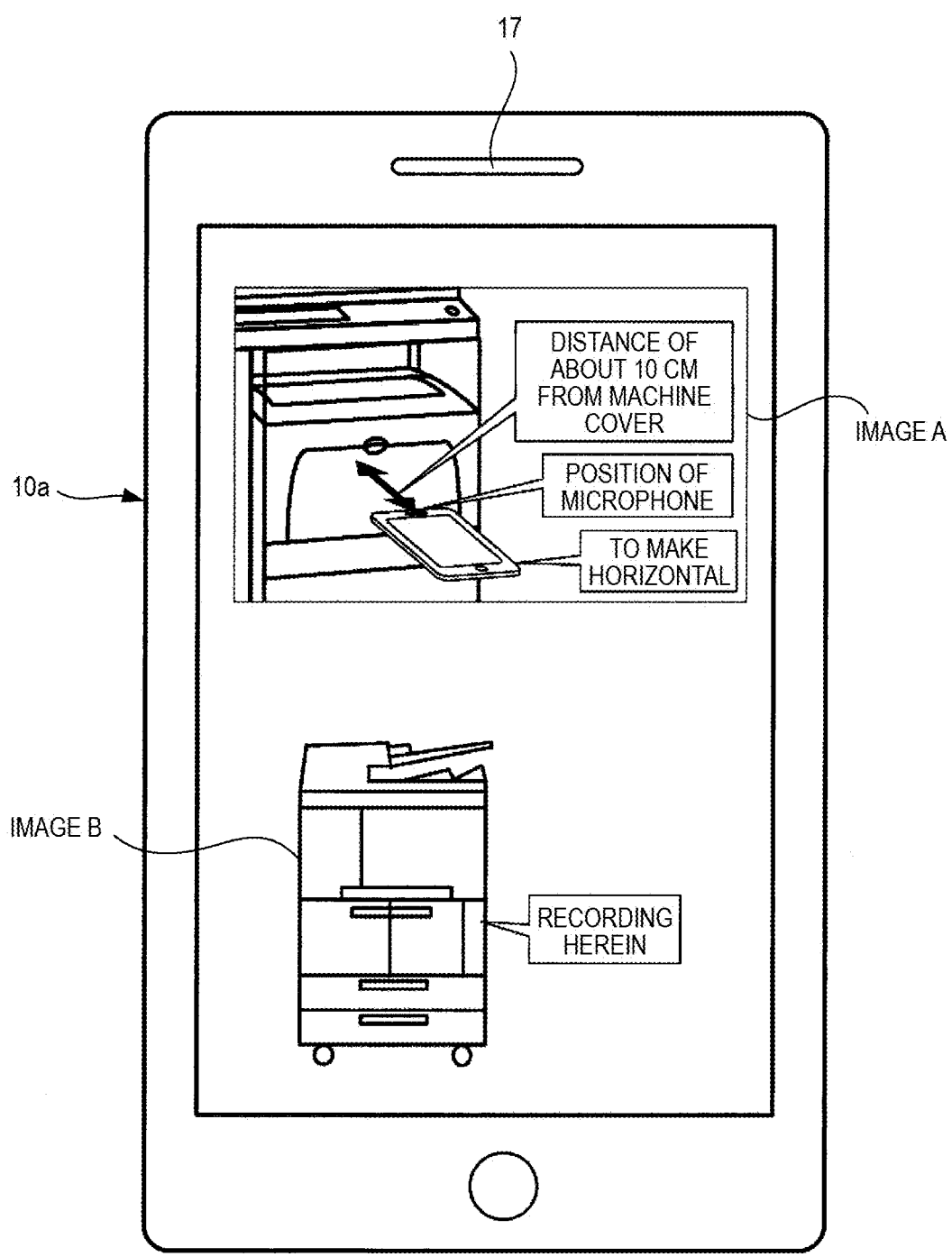

FIG. 18 is a diagram illustrating a second display instance in the terminal device 10a. In an image A displayed on the upper portion, a photo or a schematic diagram of the image forming apparatus 20 and the terminal device 10 is displayed in which a location to be recorded is enlarged, and the photo or schematic diagram is displayed with a pop-up image such as "a distance of about 10 cm from a machine cover", "a position of the microphone", or "to make horizontal" with an arrow. The pop-up image such as "a distance of about 10 cm from a machine cover" is generated from distance information, the pop-up image such as "a position of a microphone" is generated from direction information, and the pop-up image such as "to make horizontal" is generated from angle information. However, it may store the pop-up image itself without generating the pop-up image.

In an image B on a lower portion, a photo or a schematic diagram of the image forming apparatus 20 are displayed, and a pop-up image such as a "recording herein" with an arrow is displayed as indicating a recording location on the photo or schematic diagram. Such a pop-up image is generated to be displayed at a position corresponding to the region selected in step S112. However, it may store the pop-up image itself without generating the pop-up image.

The image B has a side different from that of the image forming apparatus illustrated in FIG. 14, but may has a photo or schematic diagram of the same side as in FIG. 14.

In the case of the terminal device 10b, the image of the image forming apparatus 20 is the same as that of the terminal device 10a, but a distance, an angle, and a direction relative to the image forming apparatus 20 are displayed so that the distance, the angle, and the direction are appropriate for the terminal device 10b.

Figure 19:
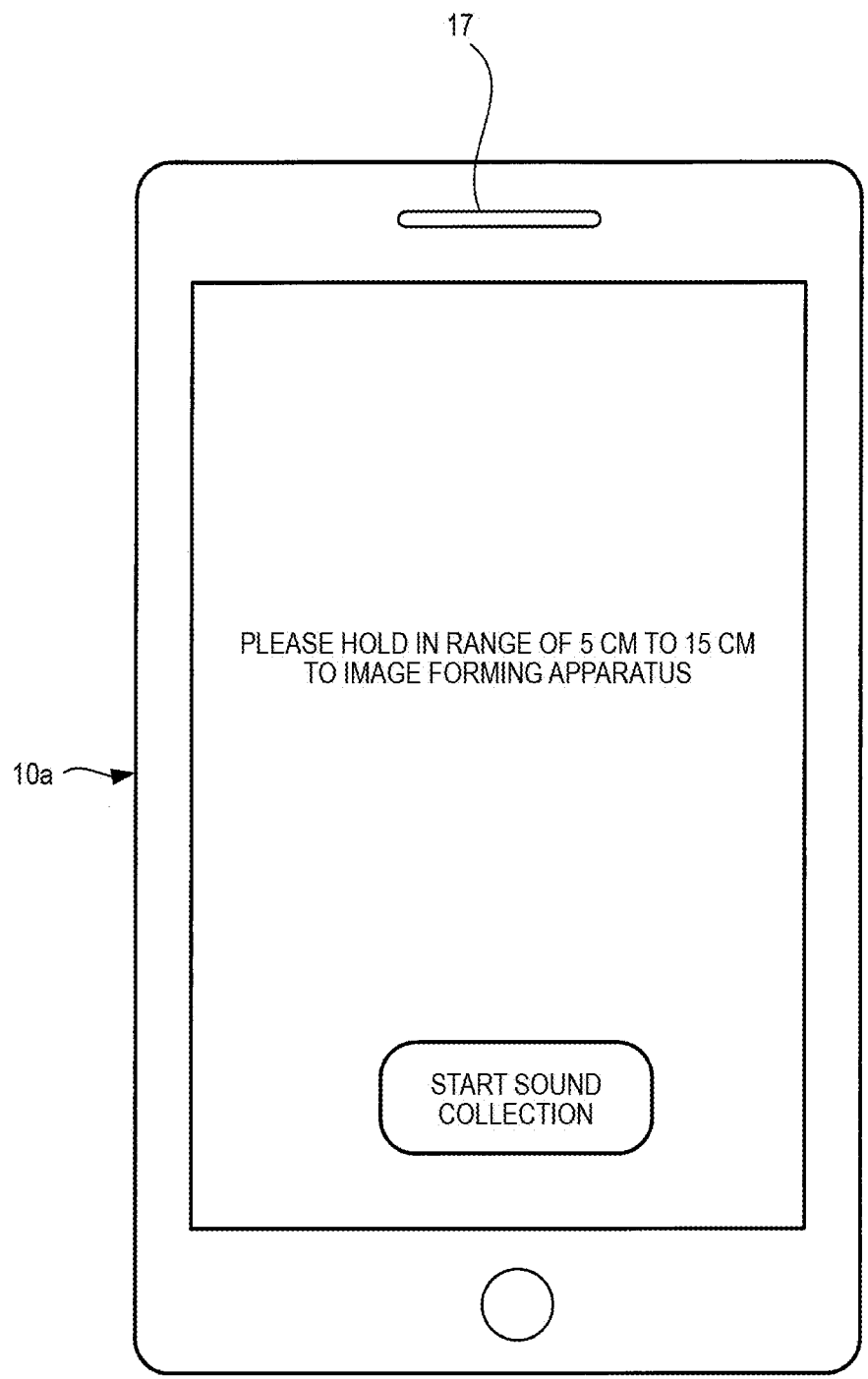

FIG. 19 is a diagram illustrating a third display instance in the terminal device 10a. In the third display instance, only letters are displayed and a range of a position which can be detected without error in the terminal device 10a is indicated. That is, the display screen of the terminal device is displayed with a text of "Please hold in the range of 5 cm to 15 cm from the image forming apparatus", for example.

In the terminal device 10b, a numerical value of the distance is appropriately displayed on the terminal device 10b.

In the recording method using the terminal device 10, as another embodiment, guidance may be realized by a sound instead of displaying the letters or the photos or by letters or photos in addition to a sound. Therefore, the phrase such as "output" including sound or display is used in the appended claims.

In the exemplary embodiment described above, while a case has been described in which the terminal device 10 is a tablet terminal device, the invention is not limited thereto. Thus, the invention can be applied also to a case where any other apparatus is used as the terminal device. For instance, in a case where an operation panel of the image forming apparatus 20 is configured to be attachable/detachable to/from a main body and communicable with the server apparatus 50 and have a built-in sound signal acquisition function, the operation panel may be used as the terminal device.

In addition, in the exemplary embodiment described above, while a case has been described in which the terminal device 10 has the microphone 17 built therein, in a case where a sound recording function is included in the terminal device 10, by externally connecting a sound collection device such as a microphone, a sound signal acquiring unit may be realized.

Furthermore, in the exemplary embodiment described above, while a case has been described in which a target apparatus for an abnormal sound analysis is an image forming apparatus, a target apparatus for the abnormal sound analysis is not limited to the image forming apparatus. Thus, the present invention can be similarly applied to any other apparatus having a possibility of generating an abnormal sound having periodicity.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A terminal device comprising:
   at least one processor configured to execute:
   a recording unit that records a sound emitted by a target apparatus;
   an output unit that outputs information comprising an instruction regarding how to record the sound emitted by the target apparatus using the terminal device,
   wherein the information includes at least a predetermined distance based on a type of the terminal device between the target apparatus and the position of a microphone of the terminal device, and
   wherein the output unit controls display of an image indicating an outer appearance of the terminal device and outputs how to hold the terminal device on a display of the terminal device.

2. The terminal device according to claim 1, wherein the instruction includes information regarding how a user should position the terminal device in a hand of the user.

3. The terminal device according to claim 1, wherein the instruction includes information regarding a position at which a user should position the terminal device.

4. The terminal device according to claim 1, wherein the at least one processor is further configured to acquire terminal device information about the terminal device,
   wherein the terminal device information comprises location of a microphone on the terminal device, and
   wherein the display unit controls display of the instruction in response to the acquired terminal device information.

5. The terminal device according to claim 1, wherein the at least one processor is further configured to acquire terminal device information about the terminal device,
   wherein the terminal device information comprises sensitivity information about a sensitivity of a microphone on the terminal device, and
   wherein the display unit controls display of the instruction in response to the acquired terminal device information.

* * * * *